United States Patent [19]
Hashimoto

[11] Patent Number: 5,515,183
[45] Date of Patent: May 7, 1996

[54] REAL-TIME HOLOGRAPHY SYSTEM

[75] Inventor: Nobuyuki Hashimoto, Iruma, Japan

[73] Assignee: Citizen Watch Co., Ltd., Tokyo, Japan

[21] Appl. No.: 213,996

[22] Filed: Mar. 15, 1994

Related U.S. Application Data

[63] Continuation of Ser. No. 838,670, Feb. 21, 1992, abandoned.

[30] Foreign Application Priority Data

Aug. 8, 1991 [JP] Japan .................................... 3-195512

[51] Int. Cl.$^6$ ............................... G03H 1/08; G03H 1/22
[52] U.S. Cl. .................................. 359/9; 359/22; 359/32; 359/559; 356/347; 348/40
[58] Field of Search ..................... 359/9, 12, 21, 359/26, 1, 10, 11, 32, 33, 22, 559, 580, 581, 54, 55, 58, 60, 95; 358/2, 90; 356/347, 348; 348/40, 311; 364/525

[56] References Cited

U.S. PATENT DOCUMENTS 3,946,430   3/1976   Ueki et al. .................................. 358/2
4,376,950   3/1993   Brown et al. ............................. 358/90

OTHER PUBLICATIONS

SPIE/IS&T "Symposium on Electronic Imaging Science and Technology", published by IS&T–The Society for Imaging Science and Technology.
"Real–Time Holography using the high–resolution LCTV–SLM", Nobuyuki Hashimoto et al., SPIE vol. 1461 Practical Holography V(1991) 291–331.
"Remote Real–Time Reconstruction of Holograms Using the Lumatron", R. J. Doyle et al., Applied Optics, May 1972, vol. 11, No. 5, 1261–1264.
"SPIE/IS&T Symposium on Electronic Imaging Science and Technology" published by IS&T–The Society for Imaging Science and Technology.

*Primary Examiner*—Ricky D. Shafer
*Attorney, Agent, or Firm*—Finnegan, Henderson, Farabow, Garrett and Dunner

[57] ABSTRACT

A real-time holography system includes a matrix liquid crystal display, as used in a liquid-crystal television set, for producing a hologram. An image of an interference-fringe pattern caused by an object light wave and a reference light wave is converted into a video signal by a CCD camera, and the image of the pattern is reproduced on the display on the basis of the video signal. Therefore, a three-dimensional image can be reconstructed in real-time by making a reference light wave on the display.

6 Claims, 5 Drawing Sheets

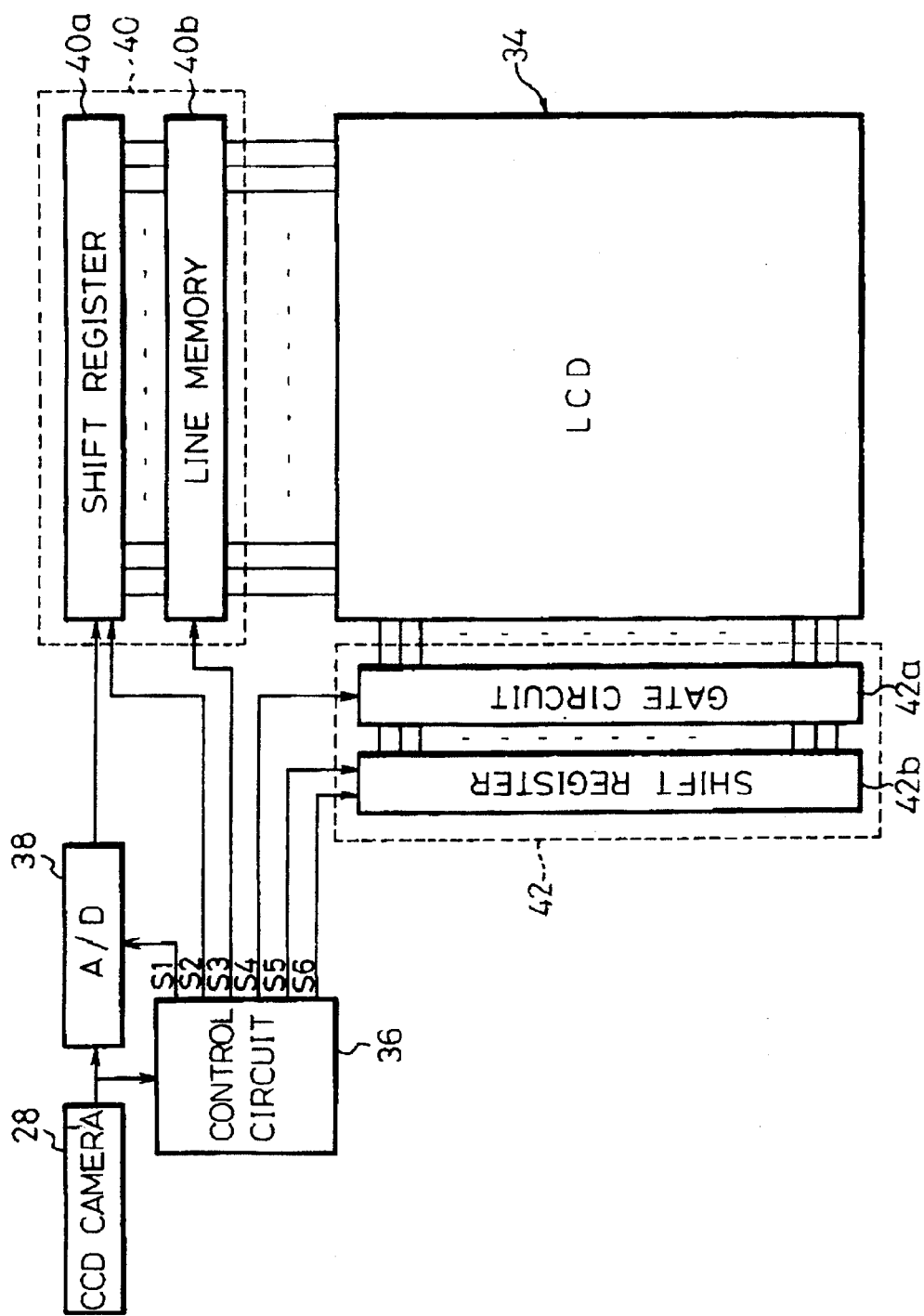

5,515,183

REAL-TIME HOLOGRAPHY SYSTEM

This application is a continuation of application Ser. No. 07/838,670, filed Feb. 21, 1992, now abandoned.

BACKGROUND OF THE INVENTION

1) Field of the Invention

The present invention relates to a holography system for a real-time reconstruction of a three-dimensional image of an object.

2) Description of the Related Art

As well known, in a holography system using a photographic technique, an object light wave and a reference light wave, derived from a coherent light such as a laser, interfere with each other on a photographic film to thereby cause an interference-fringe pattern, and that pattern is then recorded as a latent image on a photographic film. Thereafter, by developing and fixing the photographic film, a negative or hologram on which the interference-fringe pattern is recorded as a visual image can be obtained. When an reference light wave is incident on the hologram, the above-mentioned object light wave is reproduced as a diffracted light wave, whereby a three-dimensional image of an object, from which the object light wave derives, can be reconstructed. As is also well known, in a holography system using a photographic technique, the three-dimensional image of an object cannot be reconstructed in real-time, because the hologram is obtained after the photographic film is developed and fixed.

A real-time holography system is disclosed in "APPLIED OPTICS", Vol. 11/No. 5, May 1971, pages 1261 to 1268, by R. J. Doyle and W. E. Glenn. In this real-time holography system, an interference-fringe pattern caused by an object light wave and a reference light wave is recorded by an image pickup device, an image of the interference-fringe pattern is converted into a video signal, and the image of the interference-fringe pattern is then reconstructed on a transparent thermoplastic medium on the basis of the video signal. In particular, the transparent thermoplastic medium is formed of a transparent electrode and has a transparent thermoplastic layer coated thereon. The transparent thermoplastic layer is scanned with an electron beam carrying the video signal, so that an electric charge distribution corresponding to the interference-fringe pattern is formed on the thermoplastic layer, and thus an electrostatic force acts on the thermoplastic layer in response to the electric charge distribution. At the same time, the thermoplastic layer is electrically heated, whereby a surface of the thermoplastic layer is deformed and grooves and ridges are formed thereon to reproduce the interference-fringe pattern, and thus a phase hologram is produced on the thermoplastic layer surface. Thereafter, when a coherent light wave is incident on the phase hologram, a three-dimensional image of an object, from which the object light wave derives, can be reconstructed.

In this conventional real-time holography system, some time is required until the deformation of the thermoplastic layer surface is completed, and thus, in this sense, it cannot be said that the three-dimensional image is reconstructed in real-time. Also, it is very difficult and costly to reconstruct a three-dimensional motion picture by utilizing the conventional system, because a plurality of transparent thermoplastic mediums must be prepared, and because these mediums must be successively moved to a three-dimensional image reconstruction location at which the reference light wave is incident on the transparent thermoplastic medium. Furthermore, the conventional system has a drawback in that the transparent thermoplastic medium is quickly deteriorated; i.e., the reproduction of the intereference-fringe pattern on the transparent thermoplastic medium can be performed only several thousand times.

SUMMARY OF THE INVENTION

Therefore, an object of the present invention is to provide a holography system wherein a reconstruction of a three-dimensional image can be carried out substantially in real-time, a three-dimensional motion picture can be easily and inexpensively obtained, and a reconstruction of a three-dimensional image can be ensured over a long period.

In accordance with the present invention, there is provided a real-time holography system comprising: a coherent light source means for emitting a coherent light wave; a first optical means for dividing the coherent light wave into an object light wave and a reference light wave, and for causing an interference of these waves with each other to thereby produce an interference-fringe pattern; an image pickup means for taking an image of the interference-fringe pattern and converting same into a video signal; and a spatial optical modulation means for reproducing the image of the interference-fringe pattern on the basis of the video signal, the spatial modulation means including a matrix liquid crystal display.

Preferably, the optical means is arranged such that an angle at which the object and reference light waves interfere with each other is determined on the basis of a resolving power of said matrix liquid crystal display.

The real-time holography system according to the present invention may further comprise a light source for emitting a light wave, and a second optical means for making the light wave incident on the matrix liquid crystal display, to produce a zero-order diffracted light wave and a first-order diffracted light wave. The second optical means includes a lens means for focussing the zero-order and first-order diffracted light waves on a given location, and a spatial filter disposed at the given location to remove the zero-order diffracted light wave.

BRIEF DESCRIPTION OF THE DRAWINGS

The other objects and advantages of the present invention will be better understood from the following description, with reference to the accompanying drawings, in which:

FIG. 5 is a block diagram of the circuitry for driving a matrix liquid crystal display used in the real-time holography system of FIG. 3; and, FIG. 6 is a plane view of an spatial filter used in the real-time holography system of FIG. 3.

DESCRIPTION OF THE PREFERRED EMBODIMENTS

For a better understanding of a real-time holography system according to the present invention, first a principle of a photographic holography system using a photographic technique is explained with reference to FIGS. 1 and 2.

Figure 1:
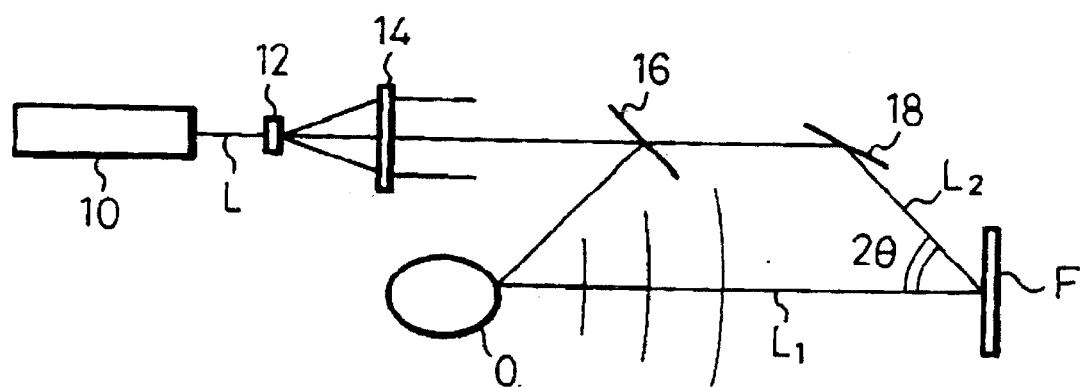
FIG. 1 is a schematic view showing an optical system for producing a hologram by using a photographic technique.

In FIG. 1, reference numeral 10 indicates a coherent light source, such as a gas laser tube, from which a laser L is emitted. The laser or coherent light L is diverged by a lens 12, converted into a parallel light by a collimate lens 14, and the parallel light is divided into two light portions by a half mirror 16. Namely, one light portion is reflected by the half mirror 16 to be directed to an object O and the other light portion is passed through the half mirror 16 to be directed to a reflector 18. The light portion reflected by the half mirror 16 illuminates the object O, and a light reflected by the object O is then directed as an object light wave $L_1$ to a photographic film F. The other light portion reflected by the reflector 18 is directed as a reference light wave $L_2$ to the photographic film F. The object light $L_1$ and the reference light waves $L_2$ interfere with each other to cause an interference-fringe pattern, and this pattern is recorded as a latent image on the photographic film F. Thereafter, by developing and fixing the photographic film F, a negative or hologram on which the interference-fringe pattern is recorded as a visual image can be obtained.

Figure 2:
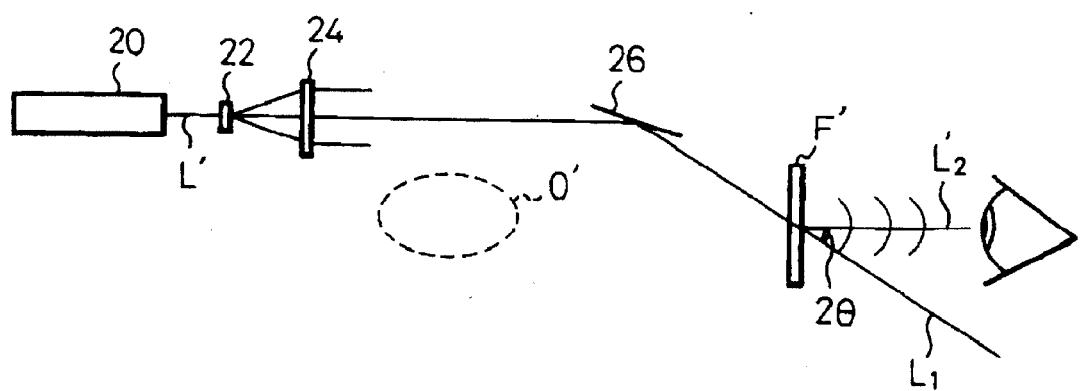
FIG. 2 is a schematic view showing an optical system for reconstructing a three-dimensional image using the hologram obtained by the optical system of FIG. 1.

In FIG. 2, the thus-obtained hologram is indicated by F' and is arranged in an optical system for reconstructing a three-dimensional image of the object O. This optical reconstruction system includes a gas laser tube 20 emitting a laser L', a lens 22 for diverging the laser L', a collimate lens 24 for converting the diverged laser light into parallel light, and a reflector 26 for reflecting the parallel light to be directed as a reference light wave to the hologram F'. The reference light wave made incident on the hologram F' is divided into a zero-order diffracted light wave $L_1'$ passing straight through the hologram F and a first-order diffracted light wave $L_2'$ defining a given angle with the zero-order diffracted light wave $L_2'$. The first-order diffracted light wave $L_2'$ corresponds to the object light wave $L_1$ (FIG. 1), and thus a three-dimensional image of the object O can be viewed as a virtual image O'. In this case, an angle $2\theta$ (FIG. 1) defined by the object and reference light waves $L_1$ and $L_2$ is equal to that defined by the zero-order and first diffracted light waves $L_1'$ and $L_2'$, and the angle $2\theta$ is preferably made larger as soon as possible, so that the zero-order diffracted light wave $L_1'$ is diverted from a visual field for viewing the image O' and does not hinder the viewing of the image O'.

Figure 3:
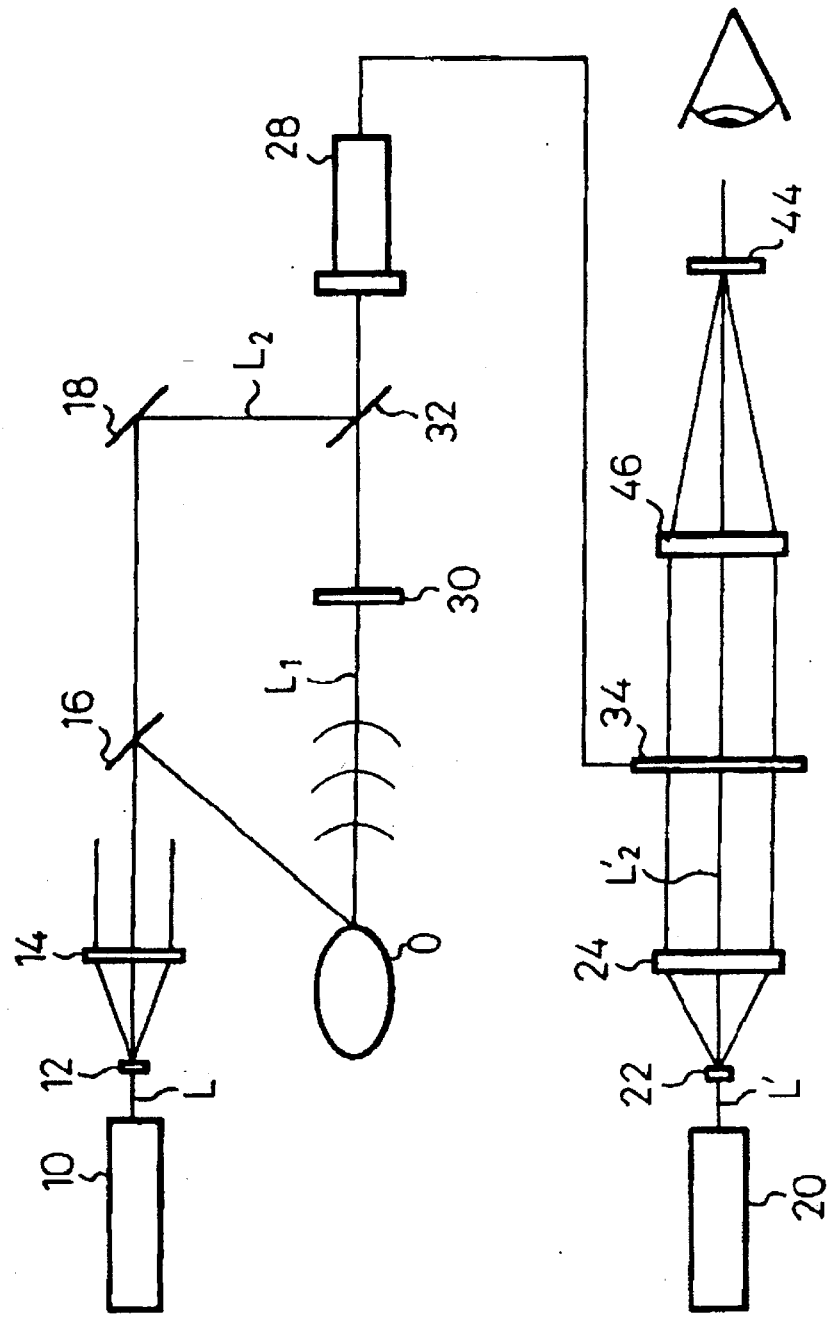
FIG. 3 is a schematic view showing a real-time holography system according to the present invention.

FIG. 3 schematically shows a real time holography system according to the present invention. Note, in FIG. 3, the features corresponding to those of FIGS. 1 and 2 are indicated by the same reference numerals and marks.

Figure 4:
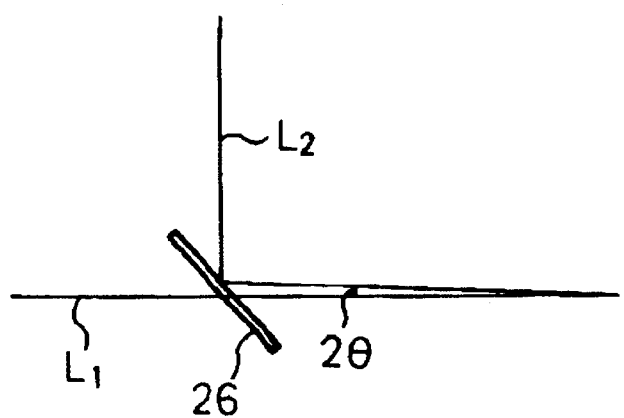
FIG. 4 is an partially enlarged view of FIG. 3 illustrating an angle at which an object light wave and a reference light wave interfere with each other.

As stated with reference to FIG. 1, a gas laser tube 10 emits a laser light L which is diverged by a lens 12, and then converted into a parallel light by a collimate lens 14. Similarly, the parallel light is divided into two light portions by a half mirror 16; one light portion being directed to an object O, and the other light portion being directed to a reflector 18. The light portion reflected by the half mirror 16 illuminates the object O and a light reflected by the object O is directed as an object light wave $L_1$ to an image pickup device 28, such as a CCD camera, through a lens 30 and a half mirror 32, so that a real image of the object O is formed by the lens 30 in the vicinity of an image pickup face of the CCD camera 28. On the other hand, the light portion directed to the reflector 18 is reflected thereby to be directed as a reference light wave $L_2$ to the half mirror 32, and is then reflected thereby to be directed to the image pickup face of the CCD camera 28. In FIG. 3, the object and reference light waves $L_1$ and $L_2$ are shown to be directed to the CCD camera 28 along a common optical axis, but in practice these lights $L_1$ and $L_2$ define a very small angle $2\theta$, for example, of from about 0.3 to about 0.4 degrees, therebetween, as shown in FIG. 4. The object and reference light waves $L_1$ and $L_2$ made incident on the image pickup face of the CCD camera 28 interfere with each other to cause an interference-fringe pattern, an image of which is converted into a video signal by the CCD camera 28. Note, the reason why the light waves $L_1$ and $L_2$ interfere with each other at the very small angle $2\theta$ is explained in detail hereafter.

Note, the CCD camera 28 is commercially available, for example, from Hitachi Electronics K.K., as Model KV-26/26L. This CCD camera has an image pickup size of ½ inches having a number of picture elements of 768(H)×490(V); a pitch of the picture elements being 11.4 μm×13.3 μm. Further note, in practice an image formation lens is removed from the CCD camera (Model KV-26/26L).

As mentioned above, in this embodiment, the real image of the object O is formed by the lens 30 in the vicinity of the image pickup face of the CCD camera 28. This is well known as an optical system for a production of a one-step image type hologram, wherein a reference light wave for reconstructing a three-dimensional image of the object may be obtained from a white light source. Note, although the lens 30 is omitted, a production of a hologram is possible, and this also is well known as an optical system for the production of a Fresnel hologram.

The interference-fringe pattern caused by the object and reference light waves $L_1$ and $L_2$ is reproduced in real-time by a spatial optical modulator 34 such as a matrix liquid crystal display (LCD). In this embodiment, an MIM(Metal-Insulator-Metal)-TN type LCD is used, having a display size of 0.96 inches and a number of picture elements of 648(H)× 240 (V); a size of each picture element being 30 μm(V)×60 μm(H).

FIG. 5 schematically shows a block diagram of the circuitry for reproducing the interference-fringe pattern on the MIM-TN type LCD 34, on the basis of the video signal output from the CCD camera 28. In the block diagram shown in FIG. 5, a control circuit 36 outputs variable control signals on the basis of vertical and horizontal synchronizing pulses included in the video signal, and an analog-digital-converter (A/D) 38 converts the video signal into 4-bit video data signals, each exhibiting a corresponding one of 16 gray-scales (gradation tones). The LCD 34 includes signal electrodes and scan electrodes (not shown) disposed at the picture element locations thereof, which are energized by a signal electrode driver circuit 40 and a scan electrode driver circuit 42. When the video signal is output from the CCD camera 28, a sampling clock signal S1 is output from the control circuit 36 to the A/D converter 38 on the basis of the horizontal synchronizing pulse, and a series of the 4-bit video data signals corresponding to the number (648) of the picture elements included in each horizontal picture element array of the LCD 34 is output from the A/D converter 38. The 4-bit video data signals are once stored in a 4-bit parallel shift register 40a of the driver circuit 40, on the basis of a shift clock signal S2 output from the control circuit 36 to the shift register 40a, and then transmitted from the shift register 40a to a line memory 40b of the driver circuit 40. When a latch clock signal S3 is output from the control circuit 36 to the line memory 40b, drive pulse voltages each having a pulse rise width corresponding to a gray-scale of each 4-bit video data signal are output from the line memory 40b to the signal electrodes of the picture elements of the LCD 34. Further, the control circuit 36 outputs a high level voltage signal S4 to a gate circuit 42a of the scan electrode driver circuit 42 having gate elements corresponding to the number (240) of the picture elements included in each vertical picture element array of the LCD 34, and a scanning pulse S5 is output from the control circuit 36 to a shift register 42b. When a shift clock signal S6 is input to the shift register 42b from the control circuit 36, the scanning pulse S5 is shifted in the shift register 42b, and thus the gate elements included in the gate circuit 42a are successively opened so that a drive voltage is applied from the scan electrode driver circuit 42 to the scan electrodes included in each horizontal picture element array of the LCD 34, whereby the interference-fringe pattern caused by the object and reference light waves $L_1$ and $L_2$ is reproduced on the display panel of the LCD 34. Note, a reproduction of an image on an LCD on the basis of a video signal by a commercially available LCD television set, is well known.

A base pitch P of the interference-fringe pattern caused by the object and reference light waves $L_1$ and $L_2$ depends upon the angle $2\theta$ therebetween. Namely, the base pitch P is defined by the following formulae:

$$2\sin(\theta) = N\lambda$$

$$N = P^{-1}$$

wherein: $\lambda$ is a wavelength; and N is a spatial frequency.

As apparent from the above formulae, the larger the angle $2\theta$ between the object and reference light waves $L_1$ and $L_2$, the smaller the base pitch P, and conversely, the smaller the angle $2\theta$, the larger the pitch P. For example, if the angle $2\theta$ is 30 degrees, the base pitch P is about 1.2 µm, and in this case, it is impossible to reproduce the interference-fringe pattern on the LCD 34 because the picture elements thereof have a size of 30 µm(V)×60 µm(H), as mentioned before. When the angle $2\theta$ is from about 0.3 to about 0.4 degrees, the base pitch P is about 100 µm, and thus it is possible to properly reproduce the interference-fringe pattern on the LCD 34. Note, if an LCD having a higher density of picture elements is developed in future, it will be possible to cause an interference of the object and reference light waves $L_1$ and $L_2$ with each other at an angle larger than 4 degrees.

The angle $2\theta$ between the object and reference light waves $L_1$ and $L^2$ is preferably determined on the basis of a resolving power of an LCD. Namely, when the LCD has a horizontal resolving power $N_H$ (1p/mm) and a vertical resolving power $N_V$ (1p/mm), optimum angles $2\theta_H$ and $2\theta_V$ are defined by the following formulae:

$$\theta_H = \sin^{-1}((N_H/4)\lambda)$$

$$\theta_V = \sin^{-1}((N_V/4)\lambda)$$

$\lambda$: wavelength

In the LCD 30 used in this embodiment, a horizontal density of the picture elements is about 33/mm ($N_H$=33/2), and a vertical density of the picture elements is about 17/mm ($N_V$=17/2). The angle $2\theta$ of from about 0.3 to about 0.4 degrees is based upon these densities of the picture elements.

Referring again to FIG. 3, the LCD 34 is arranged in an optical system for a reconstruction of a three-dimensional image of the object O. This optical reconstruction system includes a gas laser tube 20 emitting a laser L', a lens 22 for diverging the laser L', and a collimate lens 24 for converting the diverged laser into a parallel light, which is directed as a reference light wave $L_2$' to the LCD 34. When the reference light wave $L_2$' is incident on the LCD 34, the light wave $L_2$' is diffracted to produce a zero-order diffracted light wave and a first-order diffracted light wave. Note, the first-order diffracted light wave corresponds to the object wave $L_1$, and thus a three-dimensional image of the object O is represented by the first-order diffracted light wave. As mentioned above, since the object and reference light waves $L_1$ and $L_2$ interfere with each other at a very small angle of from about 0.3 to about 0.4 degrees, an incident angle of the reference light wave $L_2$' on the LCD 34 is almost perpendicular to the display face thereof, and thus the zero-order and first-order diffracted light waves exist substantially in the same visual field, and therefore, the zero-order diffracted light wave must be removed from the visual field before the three-dimensional image of the object O can be viewed. To this end, in this embodiment, the zero-order and first-order diffracted light waves are focussed on a spatial filter 44 by a lens 46, so that only the first-order diffracted light wave is passed through the spatial filter 44. Namely, the zero-order diffracted light wave is blocked by the spatial filter 44.

Figure 6:
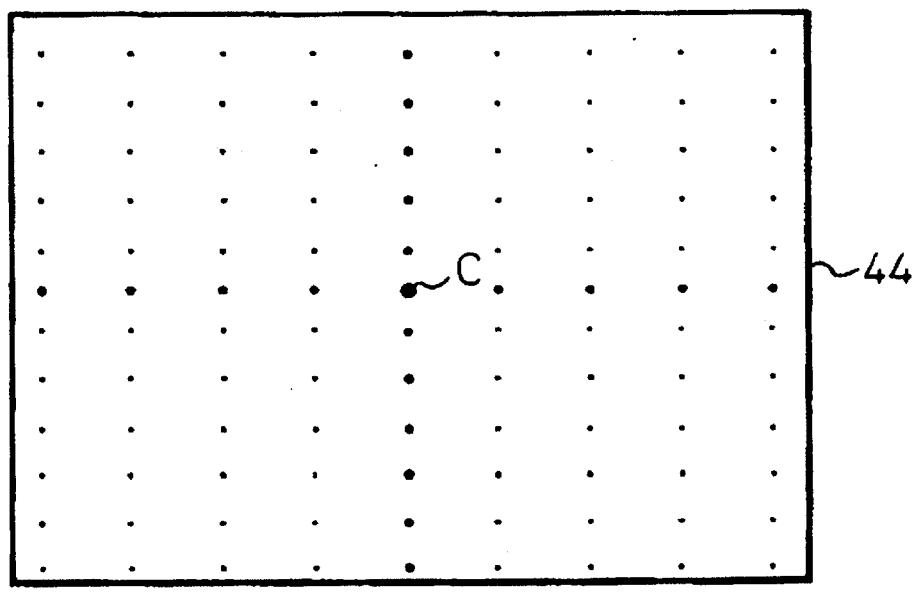

The spatial filter may be obtained by using, for example, a photographic technique. In particular, first a transparent substrate such as a glass plate is coated with a photographic emulsion, the substrate coated with the emulsion is displaced in the optical reconstruction system (FIG. 5) to the same location as the spatial filter 44, and the substrate coated with the emulsion is illuminated by the laser L'. Note, at this time no interference-fringe pattern is reproduced on the LCD 34. Thereafter, the illuminated substrate is developed and fixed, and thus the spatial filter is obtained as a negative as shown in FIG. 6. As shown in this drawing, a block spot C is formed at a location on which the zero-order diffracted light wave is focussed by the lens 46, so that, when the spatial filter 44 is disposed in the optical reconstruction system as shown in FIG. 5, the zero-order diffracted light wave is blocked by the black spot C, and thus the three-dimensional image of the object O can be clearly viewed. Note, as shown in FIG. 6, black spots other than the black spot C regularly appear in the spatial filter 44, and are derived from a diffraction caused by a matrix of the electrodes of the LCD 34.

In the embodiment described above, the LCD 34 has two polarizing plates disposed at the sides of the display panel thereof, and thus the reproduced interference-fringe pattern serves as an amplitude hologram, but when a refractive index of the display panel of the LCD 34 is changed in response to a molecular orientation of the liquid crystal, it is preferable to use the reproduced interference-fringe pattern as a phase hologram, without the polarizing plates, as the three-dimensional image of the object can be thus more brightly reconstructed.

Also, in the embodiment described above, although the LCD 34 is arranged so as to produce a transmission hologram, it can be made to serve as a reflection hologram, by attaching a mirror element to one side of the display panel of the LCD 34. Also, another image pickup device can be used in place of the CCD camera 28, and further, a semiconductor laser can be used in place of the gas laser tube 10, 20.

Finally, it will be understood by those skilled in the art that the foregoing description is of a preferred embodiment of the disclosed system, and that various changes and modifications may be made to the present invention without departing from the spirit and scope thereof.

I claim:

1. A real-time holography system, comprising:

a coherent light source means for emitting a coherent light wave;

optical means for creating an object light wave and a reference light wave from the coherent light wave, and for causing an interference of these waves with each other to thereby produce an interference-fringe pattern, said optical means being arranged such that an angle $2\theta$ at which the object and reference light waves interfere with each other is defined by the following formulae:

$$2\theta = \sin^{-1}((N/4)\lambda)$$

$$N = P^{-1}$$

wherein: $\lambda$ is a wavelength of the coherent light wave; P is a base pitch of the interference fringe-pattern; and N is a spatial frequency;

an image pickup means for taking an image of the interference-fringe pattern and converting said image into a video signal; and a matrix-addressed liquid crystal display responsive to the video signal for reproducing the image of the interference-fringe pattern.

2. The holography system of claim 1, wherein the matrix-addressed liquid crystal display comprises signal electrodes and scan electrodes at each picture element location.

3. The holography system of claim 1, wherein the matrix addressed liquid crystal display comprises a Metal-Insulator-Metal liquid crystal display.

4. A real time holography system comprising:

a coherent light source means for emitting a coherent light wave;

a first optical means for creating an object light wave and a reference light wave from the coherent light wave, and for causing an interference of these waves with each other to thereby produce an interference-fringe pattern;

an image pickup means for taking an image of the interference-fringe pattern and converting said image into a video signal; and a matrix-addressed liquid crystal display responsive to the video signal for reproducing the image of the interference-fringe pattern;

a second light source for emitting a light wave;

a second optical means for making the light wave incident on said matrix liquid crystal display to thereby produce a zero order diffracted light wave and a first order diffracted light wave, said second optical means including a lens means for focusing the zero-order and first-order diffracted light waves on a given location; and a spatial filter disposed at said given location to block the zero-order diffracted light wave.

5. A real-time holograph system as set forth in claim 4, wherein said first optical means for creating an object light wave and a reference light wave from the coherent light wave is arranged such that an angle $2\theta$ at which the object and reference light waves interfere with each other is defined by the following formulae:

$$2\theta = \sin^{-1}((N/4)\lambda)$$

$$N = P^{-1}$$

wherein: $\lambda$ is a wavelength of the coherent light wave; P is a base pitch of the interference fringe-pattern; and N is a spatial frequency.

6. A real time holography system, comprising:

a coherent light source means for emitting a coherent light wave;

an optical means for creating an object light wave and a reference light wave from the coherent light wave, and for causing an interference of these waves with each other to thereby produce an interference-fringe pattern;

an image pickup means for taking an image of the interference-fringe pattern and converting said image into a video signal;

a matrix-addressed liquid crystal display responsive to the video signal for reproducing the image of the interference-fringe pattern; and a spatial filter positioned in a visual field of the liquid crystal display to pass first order diffracted light waves while blocking zero order refractive light waves reproduced by the liquid crystal display.

* * * * *